(12) United States Patent
Matsuzaki et al.

(10) Patent No.: US 12,194,942 B2
(45) Date of Patent: Jan. 14, 2025

(54) OCCUPANT PROTECTION DEVICE

(71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Takuya Kusumura, Kiyosu (JP); Hajime Kitte, Kiyosu (JP); Yuya Suzuki, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 18/361,459

(22) Filed: Jul. 28, 2023

(65) Prior Publication Data

US 2024/0059243 A1 Feb. 22, 2024

(30) Foreign Application Priority Data

Aug. 17, 2022 (JP) .................... 2022-130294

(51) Int. Cl.
*B60R 21/18* (2006.01)
*B60R 21/207* (2006.01)
*B60R 22/46* (2006.01)

(52) U.S. Cl.
CPC ............ *B60R 21/207* (2013.01); *B60R 22/46* (2013.01)

(58) Field of Classification Search
CPC .............................. B60R 21/207; B60R 21/18
See application file for complete search history.

(56) References Cited

U.S. PATENT DOCUMENTS

2020/0122668 A1    4/2020   Ozaki et al.
2022/0306033 A1*   9/2022   Fukaura .................. B60R 21/18

FOREIGN PATENT DOCUMENTS

JP         2020-66425 A       4/2020

* cited by examiner

*Primary Examiner* — Karen Beck
(74) *Attorney, Agent, or Firm* — Posz Law Group, PLC (57) ABSTRACT

An occupant protection device includes a seatbelt having a lap belt portion; a pretensioner mechanism that takes up the seatbelt; an inflator that discharges an inflating gas; and an airbag that is joined to the lap belt portion. The airbag including a bag main body portion, which is housed folded, inflates owing to the inflating gas being supplied, and receives an occupant, and a conduit portion, which guides the inflating gas discharged from the inflator to the bag main body portion, and causes the inflating gas to flow into the bag main body portion. A length dimension along the lap belt portion of a joining region in which the airbag and the lap belt portion are joined is shorter than a length dimension along the lap belt portion of the bag main body portion in a folded state.

7 Claims, 14 Drawing Sheets

Schematic Sectional View at A-A

OCCUPANT PROTECTION DEVICE

The present application claims priority from Japanese Patent Application No. 2022-130294 of Matsuzaki et al, filed on Aug. 17, 2022, the disclosures of which are hereby incorporated into the present application by reference.

BACKGROUND

Technical Field

The present invention relates to an occupant protection device for protecting an occupant seated in a seat.

Description of Related Art

A configuration wherein an airbag is provided in an occupant waist portion restraining lap belt portion of a seatbelt is already known as an occupant protection device that protects an occupant (refer to JP2020-66425A). The airbag of the occupant protection device described in JP2020-66425A has a bag main body portion, which receives an occupant by inflating owing to an inflating gas being supplied, and a conduit portion that guides the inflating gas discharged from an inflator to the bag main body portion and causes the inflation gas to flow into the bag main body portion.

A relationship between a length dimension along the lap belt portion of the bag main body portion in a folded state and a length dimension along the lap belt portion of a contact region in which the airbag and the lap belt portion are joined is not indicated in JP2020-66425A. However, in case the length dimension of the contact region in which the airbag and the lap belt portion are joined is equal to or greater than the length dimension of the bag main body portion in a folded state, there is concern that both left and right edges of a region of the lap belt portion in which the bag main body portion is disposed separate from the waist portion of the occupant and rise up due to form retention properties of the bag main body portion. In this case, there is concern that when a pretensioner mechanism operates in response to a vehicle collision or the like and the seatbelt is taken up, occupant waist portion restraining properties of the lap belt portion worsen.

SUMMARY

An object of the invention is to provide an occupant protection device, configured in such a way that an airbag is joined to a lap belt portion, such that a worsening of occupant waist portion restraining properties of the lap belt portion when a pretensioner mechanism operates can be restricted.

A representative configuration of an occupant protection device according to the invention is as follows.

An occupant protection device includes a seatbelt having a lap belt portion that restrains a waist portion of an occupant seated in a seat, a pretensioner mechanism that takes up the seatbelt, an inflator that discharges an inflating gas, and an airbag that is joined to the lap belt portion, the airbag including a bag main body portion, which is housed folded, inflates owing to the inflating gas being supplied, and receives the occupant, and a conduit portion, which is connected to the inflator, guides the inflating gas discharged from the inflator to the bag main body portion, and causes the inflating gas to flow into the bag main body portion, wherein a length dimension along the lap belt portion of a joining region in which the airbag and the lap belt portion are joined is shorter than a length dimension along the lap belt portion of the bag main body portion in a folded state.

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
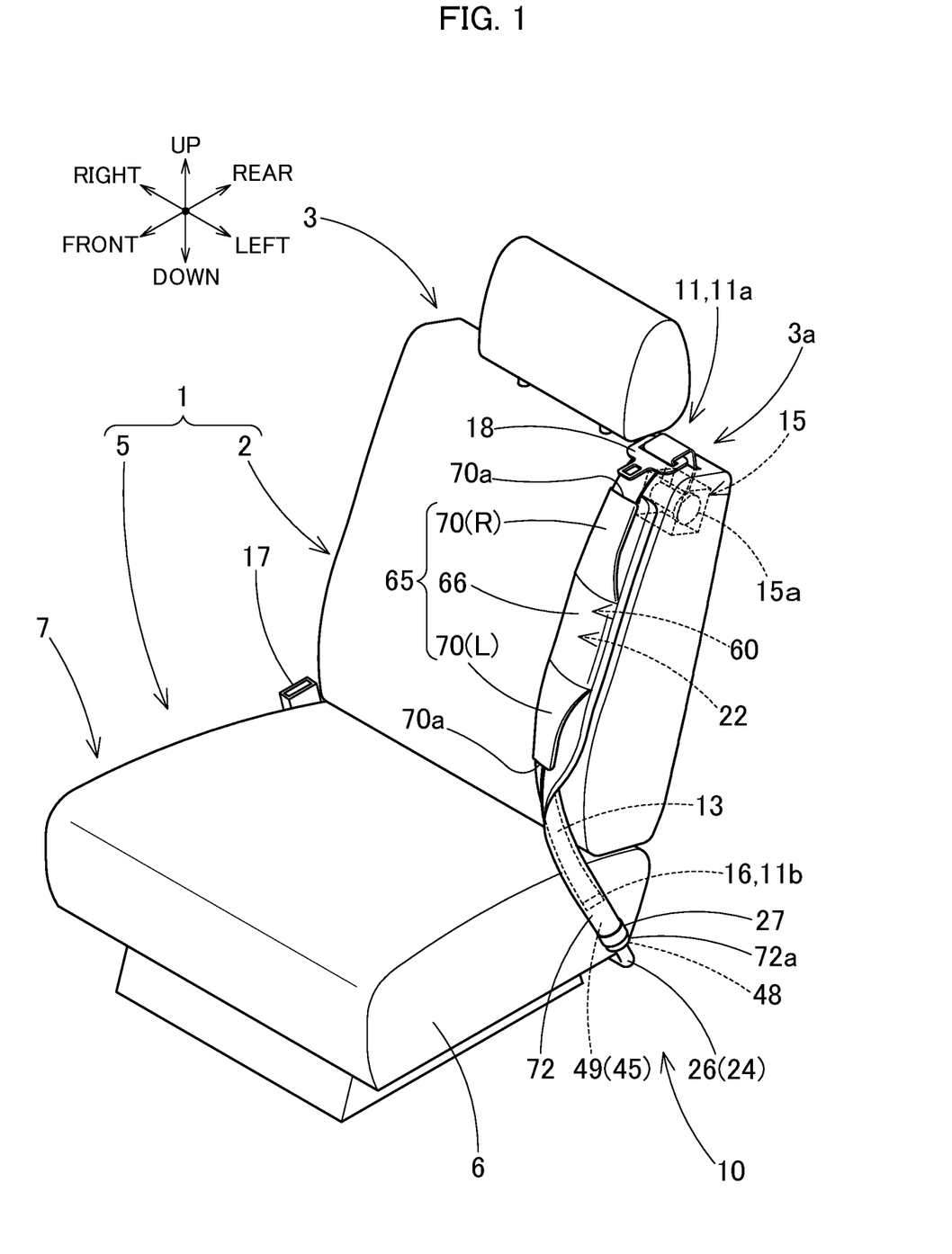
FIG. 1 is a perspective view of a seat in which an occupant protection device according to one embodiment of the invention is mounted.
Figure 2:
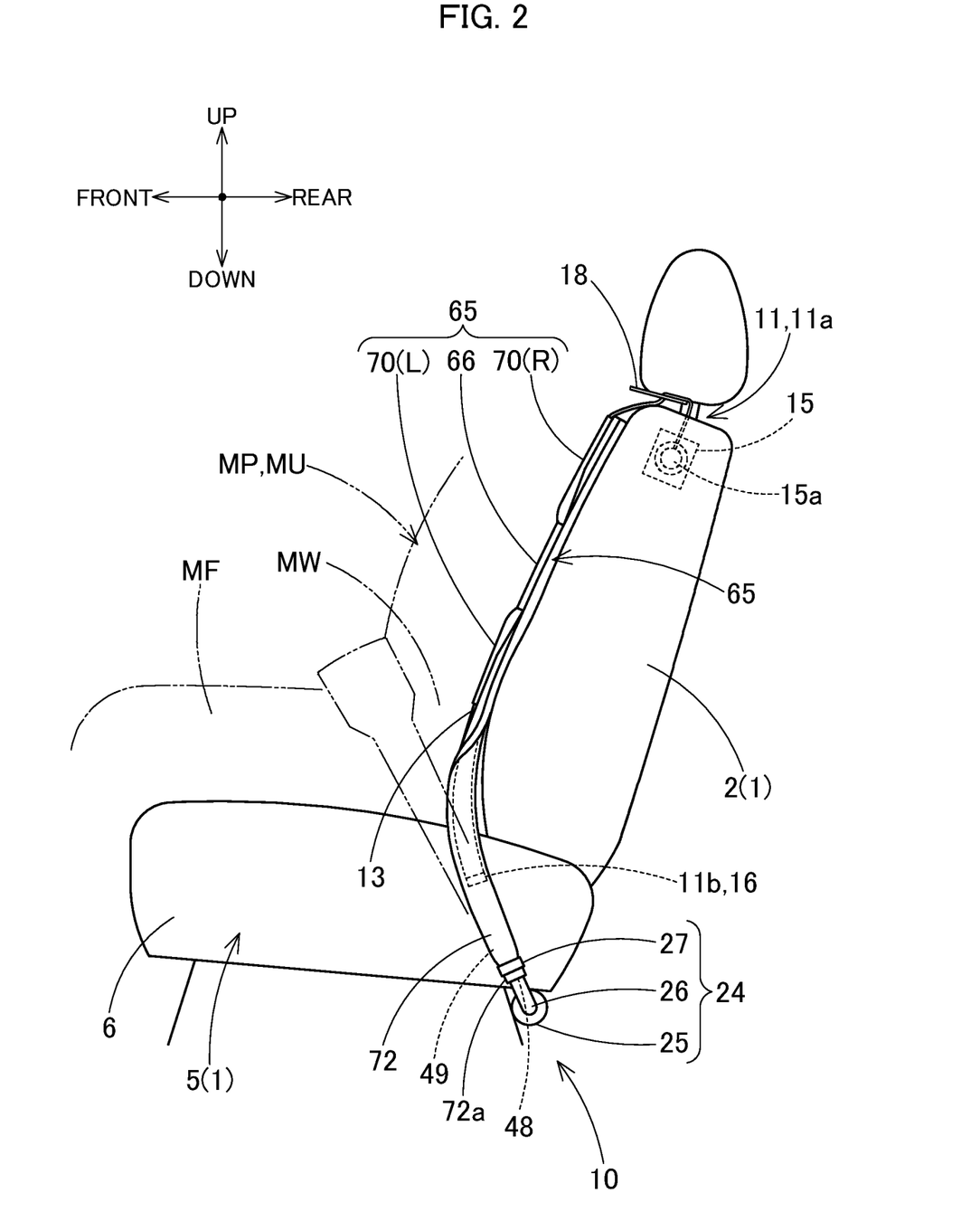
FIG. 2 is a left side view of the seat in which the occupant protection device is mounted.
Figure 3:
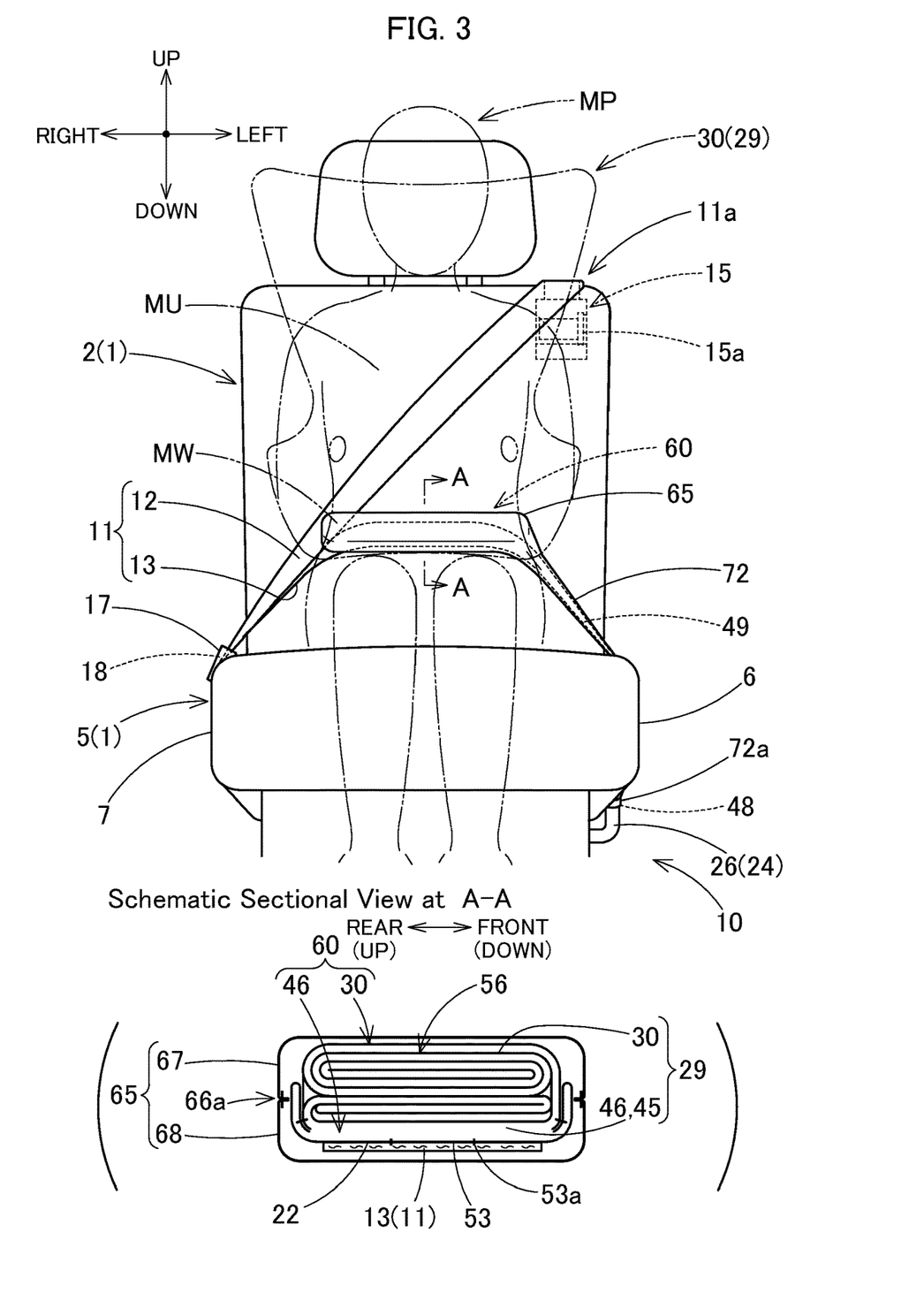
FIG. 3 is a front view of the seat in which the occupant protection device is mounted, and a sectional schematic view of an airbag.
Figure 4:
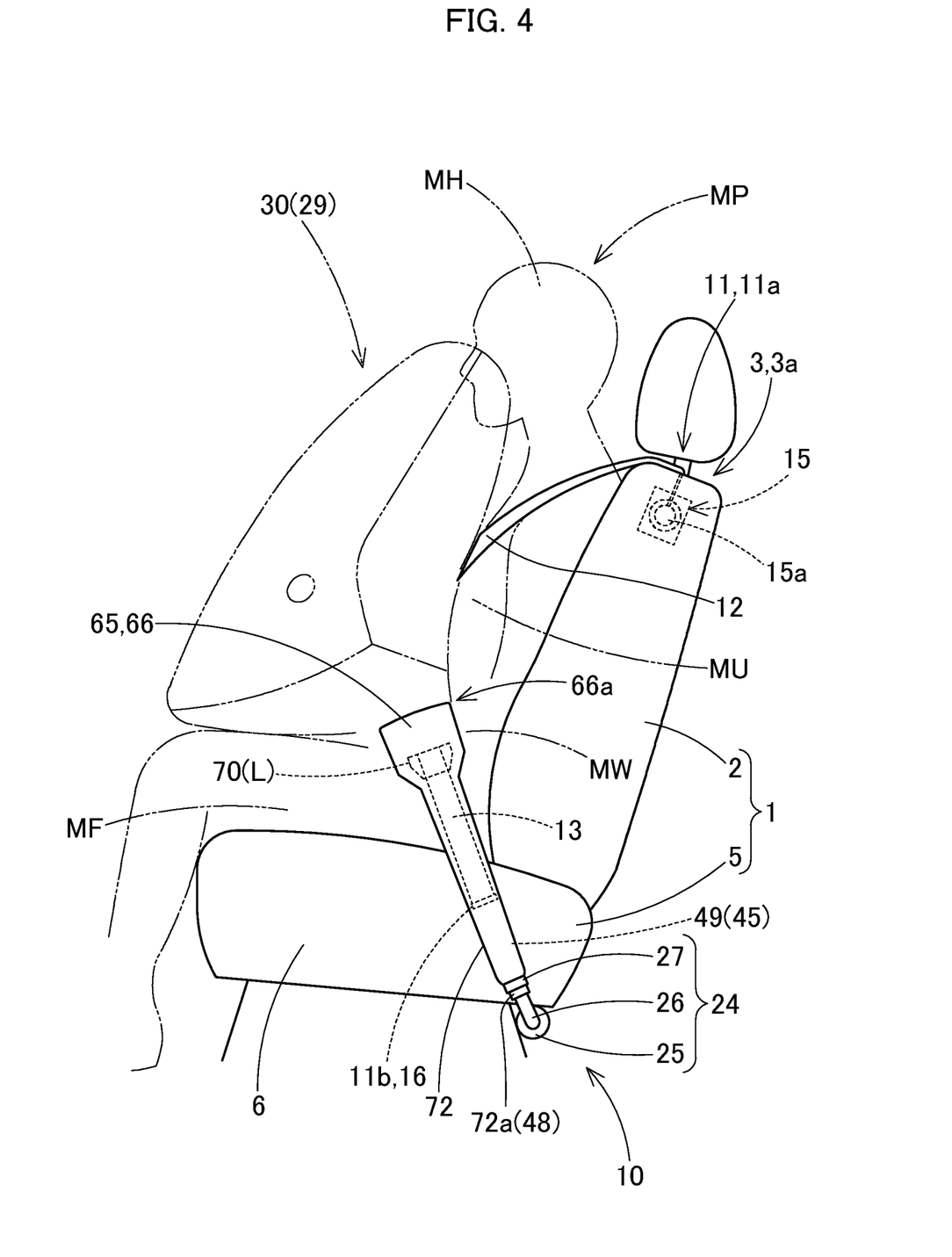
FIG. 4 is a left side view of the seat in which the occupant protection device is mounted.
Figure 5:
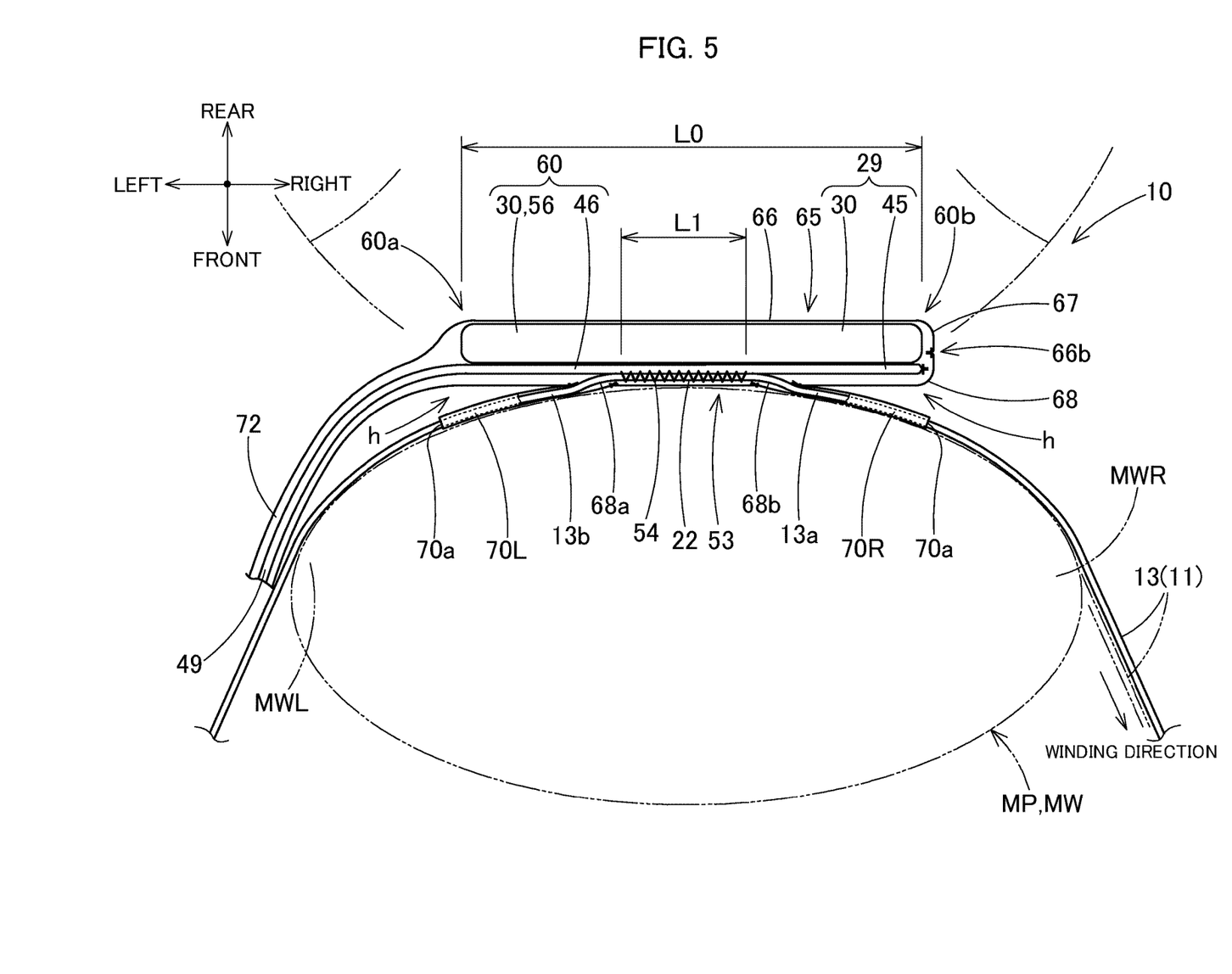
FIG. 5 is a lateral sectional schematic view of a periphery of a waist portion of an occupant in a state wherein a seatbelt is worn.

Hereafter, an occupant protection device 10 according to one embodiment of the invention will be described, based on the drawings. FIG. 1 is a perspective view of a seat 1 in which the occupant protection device 10 is mounted. FIG. 2 is a left side view of the seat 1 in which the occupant protection device is mounted. FIG. 3 is a front view of the seat 1 in a state wherein a seatbelt 11 is worn by an occupant MP, and a sectional schematic view of an airbag 29, and shows the airbag 29 when inflated as two-dotted chain lines. FIG. 4 is a left side view of the seat 1 in a state wherein the seatbelt 11 is worn by the occupant MP. FIG. 5 is a sectional schematic view of a periphery of a waist portion of the occupant MP in a state wherein the seatbelt 11 is worn.

As shown in FIGS. 1 to 5, the occupant protection device 10 is mounted in the seat 1 of a vehicle. The occupant protection device 10 includes the seatbelt 11, the airbag 29, a bag cover 65 that covers the airbag 29 in a folded state, and an inflator 24 acting as a gas supply device that supplies an inflating gas to the airbag 29. The seat 1 includes a backrest portion 2 and a seat portion 5.

The seatbelt 11 is a member for restraining the occupant MP seated on the seat 1. An upper end 11a side of the seatbelt 11 can be fed out from a retractor 15 provided in an interior on one left-right direction side (a left edge 3a side in the present embodiment) of an upper end 3 of the backrest portion 2 of the seat 1. A lower end 11b side (a leading end side) of the seatbelt 11 forms a fixed end fixed to an anchor member 16 disposed on a left side portion 6 side of the seat portion 5.

Also, a tongue 18 is disposed in an intermediate region of the seatbelt 11. The tongue 18 is fastened to a buckle 17 provided on another left-right direction side (a right side portion 7 side in the present embodiment) of the seat portion 5 of the seat 1. A state wherein the tongue 18 is fastened to the buckle 17 is a state wherein the occupant MP is wearing the seatbelt 11. The seatbelt 11 in a state wherein the tongue 18 is fastened to the buckle 17 is such that a region that extends from the tongue 18 to the retractor 15 side is a shoulder belt portion 12 disposed on a front face side of an upper body MU of the occupant MP, and a region that extends from the tongue 18 to the fixed end 11b side is a lap belt portion 13 that is disposed on a front face side of a waist portion MW of the occupant MP, and restrains the waist portion MW. An unshown release button is disposed on the buckle 17, and the tongue 18 can be removed from the buckle 17 by carrying out a pressing operation of the release button when releasing the fastening of the tongue 18.

The retractor 15 has a pretensioner mechanism 15a (a take-up unit) that causes the drawing out to stop when there is an abrupt drawing out of the seatbelt 11, and furthermore, can take up the drawn out seatbelt 11 when there is a collision or the like of the vehicle. When the pretensioner mechanism 15a operates, the lap belt portion 13 is taken up approximately 30 mm by the pretensioner mechanism 15a.

The inflator 24 acting as the gas supply device is attached and fixed to the left side portion 6 on a back side of the seat portion 5 (refer to FIGS. 1 and 2). The inflator 24 includes an approximately cylindrical inflator main body 25, which discharges an inflating gas, and a pipe portion 26 disposed bent into an approximate L-shape protruding from the inflator main body 25. A leading end portion 48 side of a conduit portion 45 of the airbag 29, to be described hereafter, is connected to the pipe portion 26. Specifically, the conduit portion 45 is mounted on an exterior of the pipe portion 26, a leading end 72a of an extended tube portion 72 of the bag cover 65, to be described hereafter, is mounted on an exterior of the conduit portion 45 from above, and a clamp 27 is fastened onto the bag cover 65 from above, whereby the conduit portion 45 is connected (coupled) to the pipe portion 26.

Figure 6:
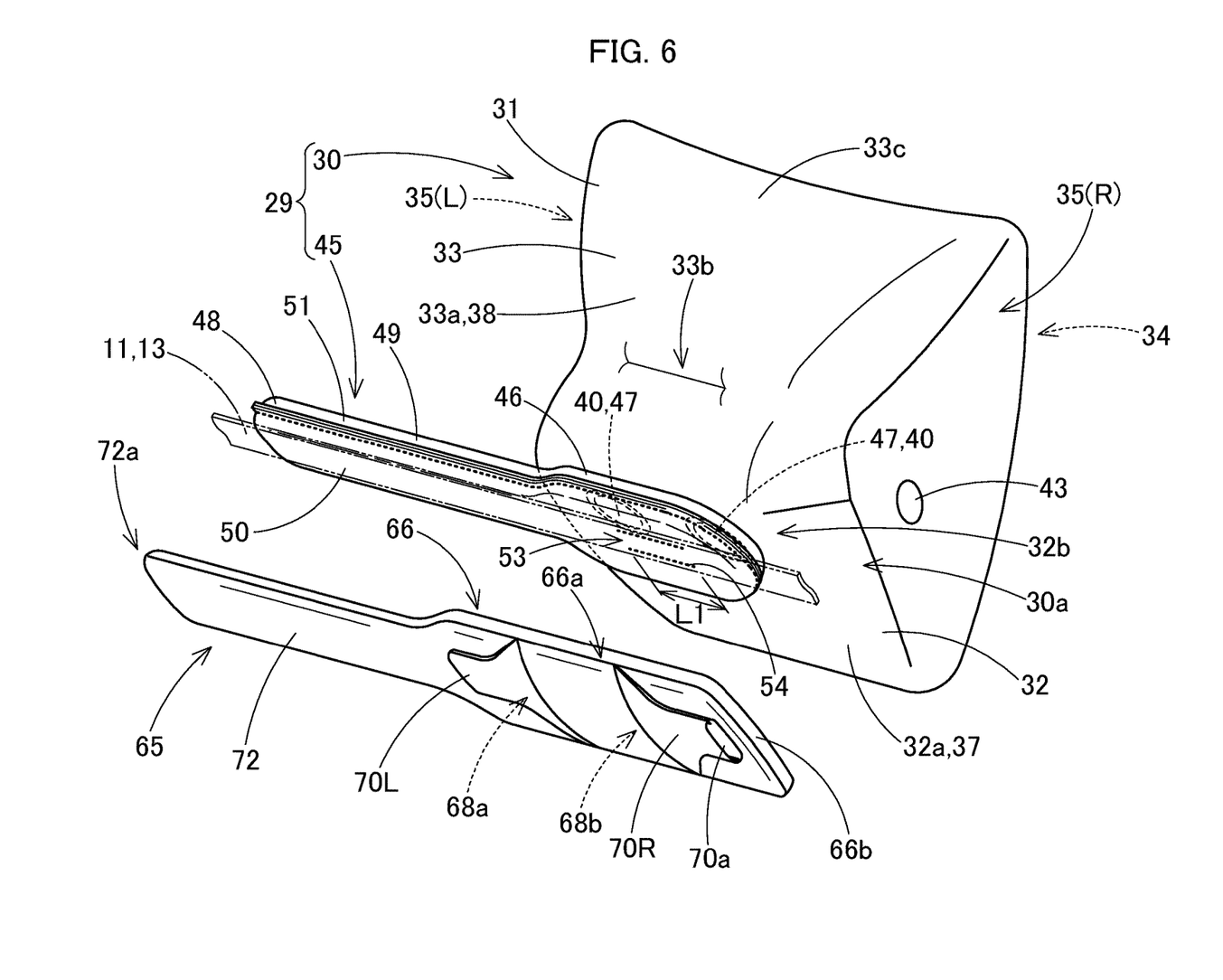
FIG. 6 is a perspective schematic view seen from a back side of the occupant protection device when the airbag is in an inflated state.
Figure 8:
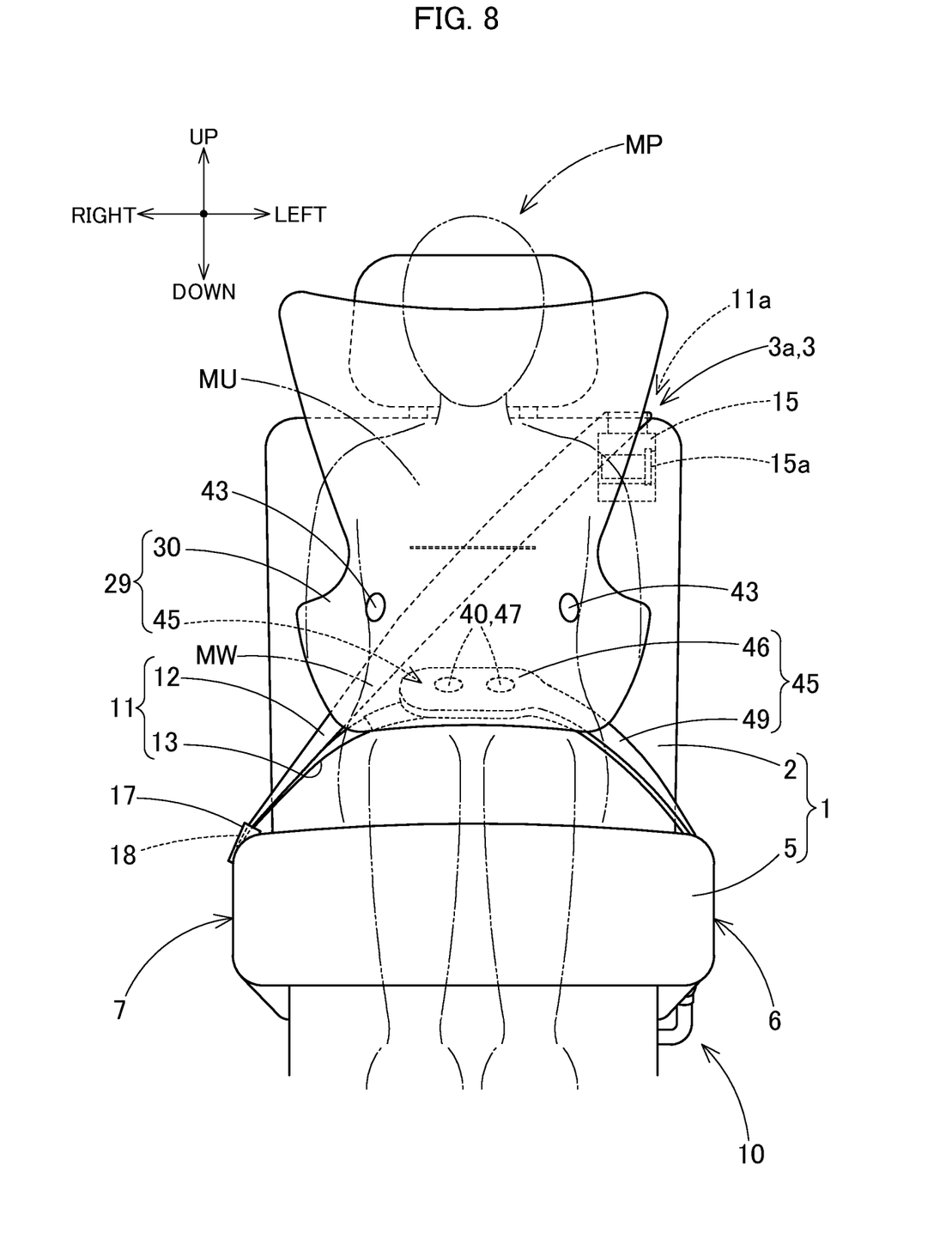
FIG. 8 is a front view of the occupant protection device when inflation of the airbag is completed.
Figure 9:
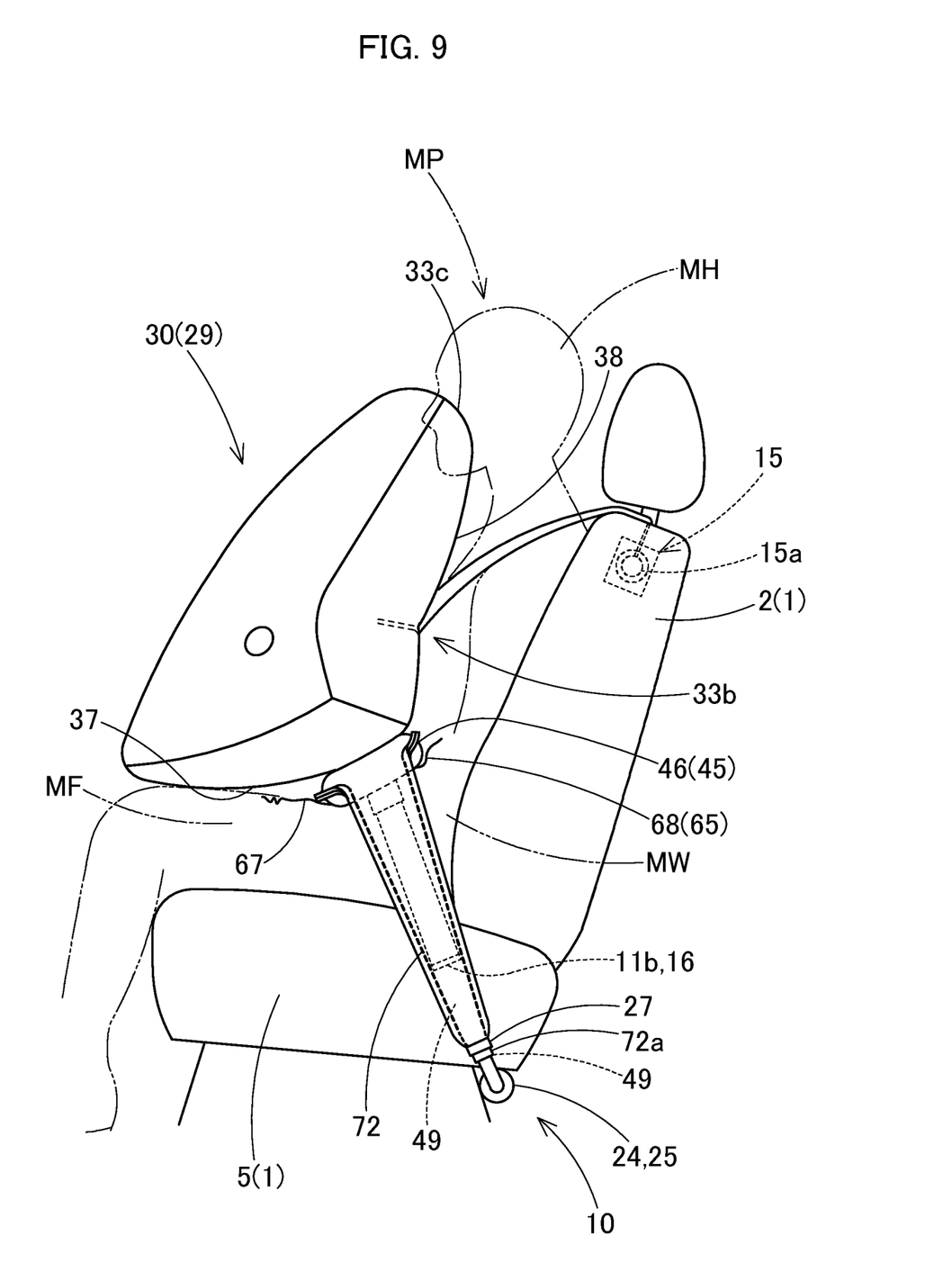
FIG. 9 is a left side view of the occupant protection device when inflation of the airbag is completed.

As shown in FIGS. 6, 8, and 9, the airbag 29 includes a bag main body portion 30, which inflates significantly owing to an inflating gas being caused to flow in, and receives the occupant MP, and the conduit portion 45, which communicates with a lower end 30a side of the bag main body portion 30, guides the inflating gas discharged from the inflator 24 to the bag main body portion 30, and causes the inflating gas to flow into the bag main body portion 30. The bag main body portion 30 and the conduit portion 45 are formed of a woven fabric having flexibility, such as polyester.

A peripheral wall 31 of the bag main body portion 30 when inflation is completed is of an approximate triangular prism form when seen from a side. The bag main body portion 30 when inflation is completed includes a bottom wall portion 32 on a bottom face side, a back wall portion 33 on a back face side, a front wall portion 34 on a front face side, a left side wall portion 35L on a left face side, and a right side wall portion 35R on a right face side. The left side wall portion 35L and the right side wall portion 35R oppose each other in the left-right direction. A lower face 32a of the bottom wall portion 32 is a supported face 37 supported by a thigh portion MF of the occupant MP, and a back face 33a of the back wall portion 33 is an occupant restraining face 38 that receives the upper body MU of the occupant MP who moves forward.

Two inflow ports 40, which are aperture portions for causing inflating gas inside the conduit portion 45 to flow in, are provided in a vicinity of a back edge 32b of the bottom wall portion 32. Also, a venthole 43, which is an aperture portion for discharging excess inflating gas flowing into the bag main body portion 30, is provided in a front portion side of the left side wall portion 35L and a front portion side of the right side wall portion 35R. A tuck portion 33b is formed in the back wall portion 33 in such a way as to reduce an up-down direction dimension, whereby an upper end 33c side of the back wall portion 33 comes into proximity with a head portion MH of the occupant MP when inflation of the bag main body portion 30 is completed.

Figure 7:
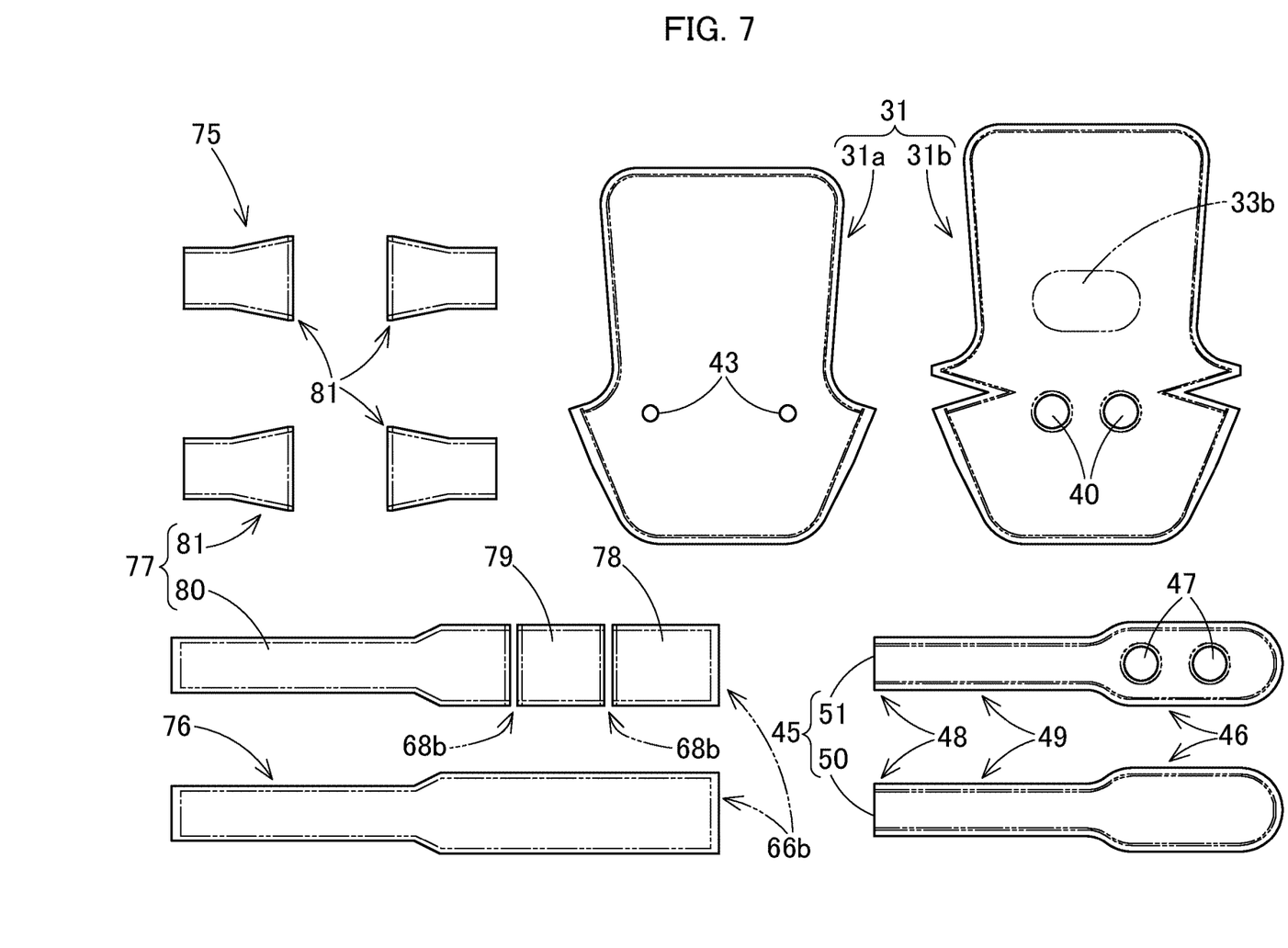
FIG. 7 is a drawing showing airbag configuration materials.

As shown in FIGS. 6 and 7, the peripheral wall 31 of the bag main body portion 30 is formed by two sheet members, those being a front side region 31a and a back side region 31b, being sewn together. The front side region 31a includes a region forming the front wall portion 34, the front portion side of the left side wall portion 35L, and the front portion side of the right side wall portion 35R, and the back side region 31b includes a region forming the back wall portion 33, the bottom wall portion 32, a back portion side of the left side wall portion 35L, and a back portion side of the right side wall portion 35R.

A base portion 46 (one end portion) of the conduit portion 45 is linked (joined) to the inflow port 40 of the bag main body portion 30 of the airbag 29. A leading end portion 48 (another end portion) of the conduit portion 45 is linked (joined) to the pipe portion 26 of the inflator 24. The base portion 46 is wide, and a region between the leading end portion 48 and the base portion 46 forms a tubular intermediate portion 49 of a width dimension equivalent to a width dimension of the leading end portion 48. The conduit portion 45 is formed by sewing together outer peripheral edges of an outer side member 50 and a bag side member 51 whose external forms are the same as each other (refer to FIGS. 6 and 7). A communication port 47 that communicates with the inflow port 40 of the bag main body portion 30 is provided in the base portion 46 of the conduit portion 45. A peripheral edge of the communication port 47 is sewn to a peripheral edge of the inflow port 40, whereby the conduit portion 45 is linked to the back edge 32b side of the bottom wall portion 32 forming the lower end 30a of the bag main body portion 30. The conduit portion 45 guides an inflating gas discharged from the inflator main body 25 to the bag main body portion 30, thereby supplying the inflating gas to the bag main body portion 30.

Also, the conduit portion 45 is such that a region of the outer side member 50 in the base portion 46 separated from the bag main body portion 30 is joined as a joining region 53 to a bag disposition region 22 of the lap belt portion 13 by sewing using a thread 54. That is, the airbag 29 is joined to the lap belt portion 13 such that the conduit portion 45 joined to the bag main body portion 30 is joined by sewing to the lap belt portion 13.

A length dimension L1 of the joining region 53 along the lap belt portion 13 is set to be shorter than a length dimension L0 of a bag assembly 60, to be described hereafter, along the lap belt portion 13. In the present embodiment, the length dimension L1 is approximately 100 mm, and the length dimension L0 is approximately 260 mm (refer to FIG. 5). Herein, in the present embodiment, the conduit portion 45 is joined by sewing to the lap belt portion 13, meaning that the length dimension L1 of the joining region 53 along the lap belt portion 13 is a length dimension along the lap belt portion 13 in a portion in which the conduit portion 45 and the lap belt portion 13 are sewn together.

When forming the conduit portion 45, the peripheral edge of the communication port 47 of the bag side member 51 is sewn to the peripheral edge of the inflow port 40 of the bag main body portion 30 before the outer peripheral edges of the outer side member 50 and the bag side member 51 are sewn together, and the joining portion 53 of the outer side member 50 is sewn to the bag disposition region 22 of the lap belt portion 13.

The bag main body portion 30 is folded and joined as a folded body 56 to the bag disposition region 22 together with the base portion 46 of the conduit portion 45, forming the bag assembly 60. The folded body 56 is formed by, while flattening a whole region of the front wall portion 34 in the peripheral wall 31 of the bag main body portion 30, overlaying the front wall portion 34 on the back wall portion 33 in a state wherein a vicinity of the inflow port 40 is flattened and on a region of the flattened bottom wall portion 32, folding both the left and right peripheral edges in the overlaid state to the inflow port 40 side of the front wall portion 34 side, and furthermore, folding both end sides perpendicular to the left-right direction in such a way as to come into proximity on the inflow port 40 on the front wall portion 34 side.

Also, the bag assembly 60 is installed covered by the bag cover 65 in the lap belt portion 13. The bag cover 65 is formed of a cover material 75 formed of a sheet member of artificial leather or the like having decorative properties (refer to FIG. 6). The bag cover 65 includes a main body cover portion 66, which covers the bag assembly 60 together with the joining region 53, tubular belt cover portions 70 (L and R), which cover vicinity regions 13a and 13b of the lap belt portion 13 extending left and right from the joining region 53, and which protrude from the main body cover portion 66, and the tubular extended tube portion 72, which extends from the main body cover portion 66 and covers the intermediate portion 49 of the conduit portion 45. The main body cover portion 66 includes a front side portion 67, which separates from the occupant MP when the lap belt portion 13 is worn, and a back side portion 68 on the occupant MP side. Communication apertures 68a and 68b, through which the vicinity regions 13a and 13b of the lap belt portion 13 are caused to protrude, are opened in the back side portion 68. Although outer peripheral edges of the front side portion 67 and the back side portion 68 are sewn together, an edge on an upper side when the lap belt portion 13 is worn forms a protrusion edge 66a that can open in such a way as to cause the bag main body portion 30 when inflating to protrude.

The belt cover portions 70L and 70R are tubular (of an approximately rectangular tube form) regions that protrude from peripheral edges of the communication apertures 68a and 68b, and a lead-out hole 70a through which the lap belt portion 13 is inserted is formed in a leading end of each.

The cover material 75 includes a front side material 76, which extends from the front side portion 67 of the main body cover portion 66 to a front side region of the extended tube portion 72, a back side material 77, which extends from the back side portion 68 of the main body cover portion 66 to a back side region of the extended tube portion 72, and four belt cover materials 81, which form the belt cover portions 70 (L and R) (refer to FIG. 7). The back side material 77 is formed of an end side portion 78, an intermediate portion 79, and an extended side portion 80. A region between the end side portion 78 and the intermediate portion 79 forms a region in which the communication aperture 68b is formed, a peripheral edge thereof forms a region linked to the belt cover portion 70R, a region between the intermediate portion 79 and the extended side portion 80 forms a region in which the communication aperture 68a is formed, and a peripheral edge thereof forms a region linked to the belt cover portion 70L.

The bag cover 65 is such that the belt cover material 81 is sewn to each of the region of the back side material 77 of the cover material 75 between the end side portion 78 and the intermediate portion 79 and the region between the intermediate portion 79 and the extended side portion 80, and corresponding outer peripheral edges of the belt cover material 81 are sewn together, forming the belt cover portions 70 (L and R). At this time, the back side material 77 is formed by the end side portion 78, the intermediate portion 79, and the extended side portion 80 being linked to each other. Further, the bag cover 65 is formed by the front side material 76 being sewn to the back side material 77.

Note that the bag cover 65 is formed by forming the main body cover portion 66 and the belt cover portions 70 (L and R) leaving an assembly aperture 66b in a leading end side of the main body cover portion 66. The assembly aperture 66b is utilized when causing the bag assembly 60 to join the bag disposition region 22 of the lap belt portion 13.

Assembly of the occupant protection device 10 will be described. Firstly, the folded body 56 is formed by folding the bag main body portion 30 in a state wherein a region of the bag side member 51 on the peripheral edge of the communication port 47 of the base portion 46 of the conduit portion 45 is sewn to the peripheral edge of the inflow port 40 in the bottom wall portion 32 of the bag main body portion 30. Also, the fixed end 11b side before fixing to the seat 1 of the seatbelt 11 fed out from the retractor 15 is inserted into the bag cover 65 from the lead-out hole 70a of the belt cover portion 70R of the bag cover 65, this is extracted from the assembly aperture 66b, and the joining region 53 of the outer side member 50 of the conduit portion 45 is sewn to the bag disposition region 22 of the extracted lap belt portion 13 utilizing the thread 54. Next, the outer peripheral edges of the outer side member 50 and the bag side member 51 are sewn together, forming the conduit portion 45. Further, the fixed end 11b side of the seatbelt 11 is inserted into the main body cover portion 66 of the bag cover 65, and furthermore, caused to protrude from the lead-out hole 70a of the bag cover portion 70L via the belt cover portion 70R. Also, the leading end portion 48 side of the conduit portion 45 is inserted into the main body cover portion 66, and furthermore, caused to protrude from the leading end 72a via the extended tube portion 72 of the bag cover 65, together with which the bag assembly 60 formed of the folded body 56 and the base portion 46 of the conduit portion 45 is housed in the main body cover portion 66 of the bag cover 65, and the assembly aperture 66b of the bag cover 65 is closed off by sewing. Next, the fixed end 11b of the seatbelt 11 is linked and fixed to the anchor member 16 of the left side portion 6 of the seat portion 5 of the seat 1, together with which the leading end portion 48 of the conduit portion 45 is linked together with the leading end 72a of the extended tube portion 72 of the bag cover 65 to the pipe portion 26 of the inflator 24 already installed in the seat 1, utilizing the clamp 27. By so doing, the occupant protection device 10 can be mounted in the seat 1.

The occupant MP seated on the seat 1 puts on the seatbelt 11 by feeding out the seatbelt 11 and fastening the tongue 18 to the buckle 17, thereby wearing the lap belt portion 13 to which the bag assembly 60 is attached around the waist portion MW. In other words, the occupant MP seated on the seat 1 puts on the seatbelt 11 by feeding out the seatbelt 11 and fastening the tongue 18 to the buckle 17, thereby wearing the lap belt portion 13 to which the airbag 29 is joined around the waist portion MW. When doing so, a gap h is formed between left and right edge 60a and 60b sides of the bag assembly 60 in front of left and right edge MWL and MWR sides of the waist portion MW of the occupant MP, as shown in FIG. 5. Meanwhile, the lap belt portion 13 itself is worn tightly on the waist portion MW of the occupant MP. That is, as the length dimension L1 of the joining region 53 to which the bag assembly 60 is to be attached in the bag disposition region 22 of the lap belt portion 13 is shorter than the length dimension L0 of the bag assembly 60, the lap belt portion 13 is worn tightly on the waist portion MW of the occupant MP in a region equivalent to the shorter dimension. Seen from another perspective, the length dimension L1 of the joining region 53 along the lap belt portion 13 is shorter than a length dimension of the bag main body portion 30 in a folded state along the lap belt portion 13, because of which a region in which a force maintaining the form of the bag main body portion 30 acts on the lap belt portion 13 becomes smaller, as a result of which the lap belt portion 13 is worn tightly on the waist portion MW of the occupant MP. This means that on the pretensioner mechanism 15a operating, the lap belt portion 13 worn tightly on the waist portion MW of the occupant MP is taken up, and the waist portion MW of the occupant MP is appropriately secured. Consequently, according to the occupant protection device 10 of the present embodiment, a configuration wherein the airbag 29 is joined to the lap belt portion 13 is such that a worsening of a performance of the lap belt portion 13 in restraining the waist portion MW of the occupant MP when the pretensioner mechanism 15a operates can be restricted, and the waist portion MW of the occupant MP can be appropriately secured.

Also, on the inflator 24 operating after the operation of the pretensioner mechanism 15a, an inflating gas flows into the bag main body portion 30 via the leading end portion 48, the intermediate portion 49, the base portion 46, the communication port 47, and the inflow port 40 of the conduit portion 45. On the bag main body portion 30 starting to inflate owing to the inflating gas, the bag cover 65 is subjected to pressure from the bag main body portion 30 and ruptures, and the bag main body portion 30 is fed out from the bag disposition region 22 of the lap belt portion 13. Subsequently, the bag main body portion 30 completes inflation in front of the upper body MU of the occupant MP, attaining the state shown in FIGS. 8 and 9. Because of this, the bag main body portion 30 supported by the thigh portion MF at the supported face 37 receives the upper body MU of the occupant MP who moves forward with the occupant restraining face 38, whereby the occupant MP is protected.

Figure 10:
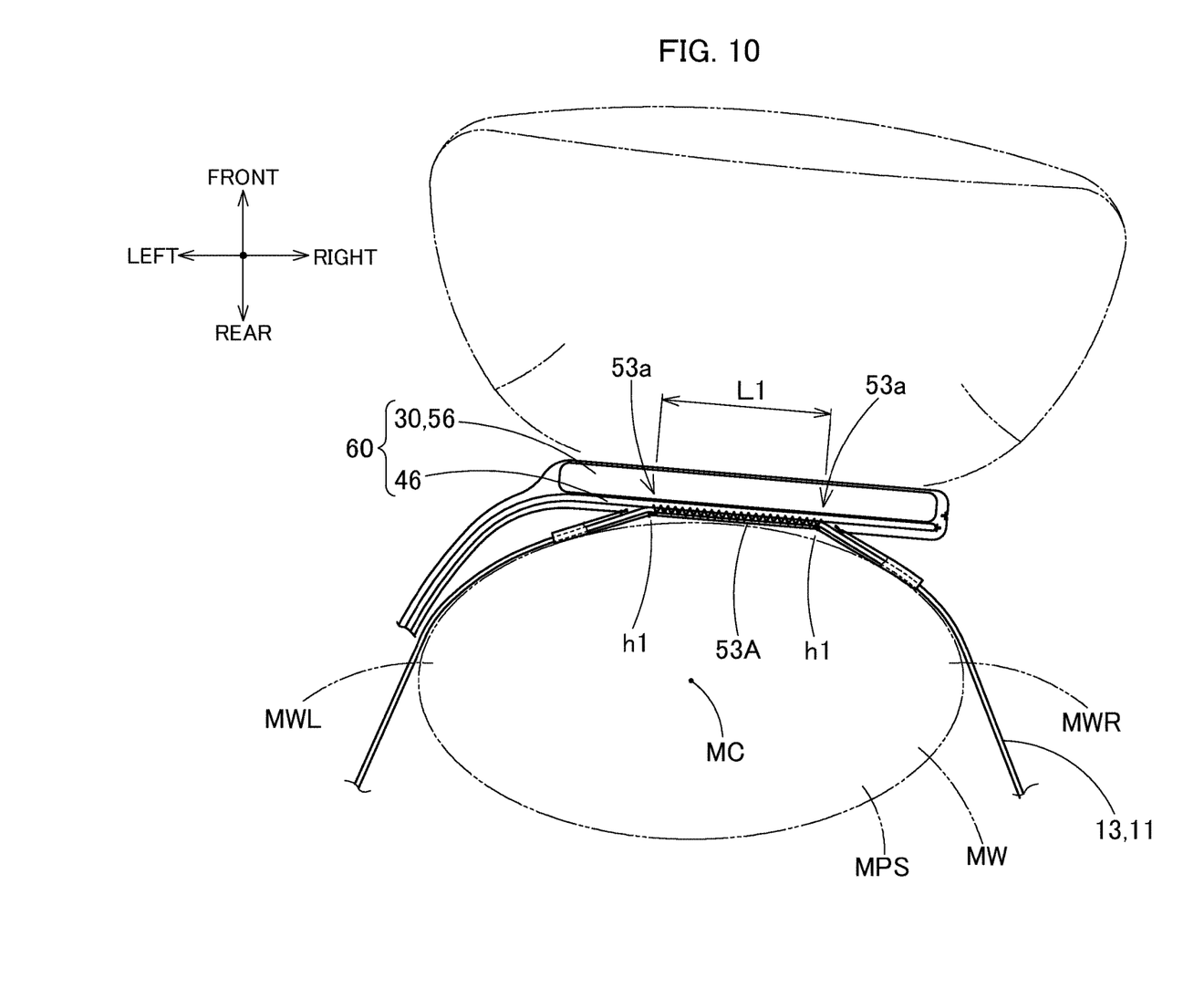
FIG. 10 is a lateral sectional schematic view of the periphery of the waist portion of the occupant in a state wherein a length dimension of a joining region is longer, and the seatbelt is worn in a case wherein the occupant is a small-bodied occupant.

Also, the length dimension L1 of the joining region 53 along the lap belt portion 13 is set to be 100 mm, which is within the range of 50 to 120 mm. Because of this, the following advantage is obtained. That is, when the length dimension L1 of the joining region 53 is less than 50 mm, joining strength of the bag assembly 60 attached to the lap belt portion 13 is difficult to ensure. Also, when the length dimension L1 of the joining region 53 exceeds 120 mm, a state wherein the lap belt portion 13 is in close contact with the waist portion MW of the occupant MP is difficult to ensure. Specifically, in a case wherein the occupant MP wearing the lap belt portion 13 is a small-bodied occupant MPS, as shown in FIG. 10, a position of a joining region 53A when the lap belt portion 13 is worn deviates to the left or right with respect to a left-right direction center MC of the occupant MPS, and the possibility arises of the joining region 53A being disposed in a position of large curvature in the periphery of the waist portion MW. In this case, when the length dimension L1 of the joining region 53A exceeds 120 mm, a gap h1 is liable to appear between vicinities of edges 53a and 53a of the joining region 53A and the edge MWR and MWL sides of the waist portion MW of the occupant MPS, leading to a decrease in a securing force. Because of this, the length dimension L1 of the joining region 53 is preferably within the range of 50 to 120 mm, and more preferably within the range of 70 to 100 mm.

Also, the bag assembly 60 is such that the regions 13a and 13b of the lap belt portion 13 extending left and right from the joining region 53 are caused to protrude, and is disposed covered by the bag cover 65 in such a way as to be able to open when the bag main body portion 30 inflates. This means that as the bag assembly 60 is covered by the bag cover 65, a foreign body entering the folded body 56, wherein the bag main body portion 30 is folded, can be prevented, and an unraveling of the bag main body portion 30 can be prevented.

Also, the bag cover 65 includes the main body cover portion 66, which covers the bag assembly 60 together with the joining region 53, and the tubular belt cover portions 70 (L and R), which cover the regions 13a and 13b of the lap belt portion 13 protruding from the main body cover portion 66 and extending left and right from the joining region 53. This means that the bag cover 65 covers not only the bag assembly 60 but also the lap belt portion 13 in a vicinity of the joining region 53, because of which a foreign body entering the folded body 56 of the bag main body portion 30 is easily prevented.

Figure 11:
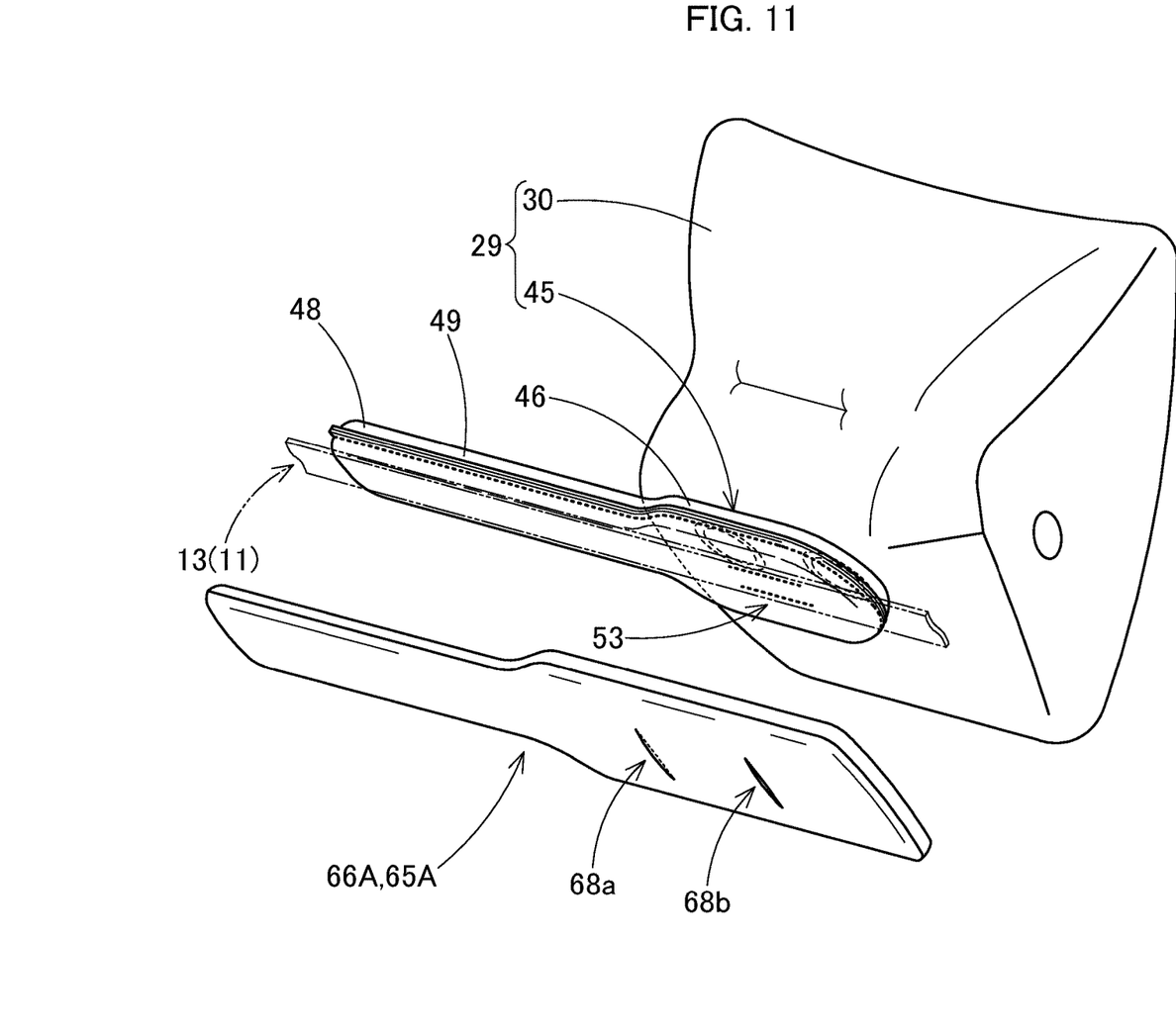
FIG. 11 is a perspective schematic view of an airbag cover in an occupant protection device according to a modification.
Figure 12:
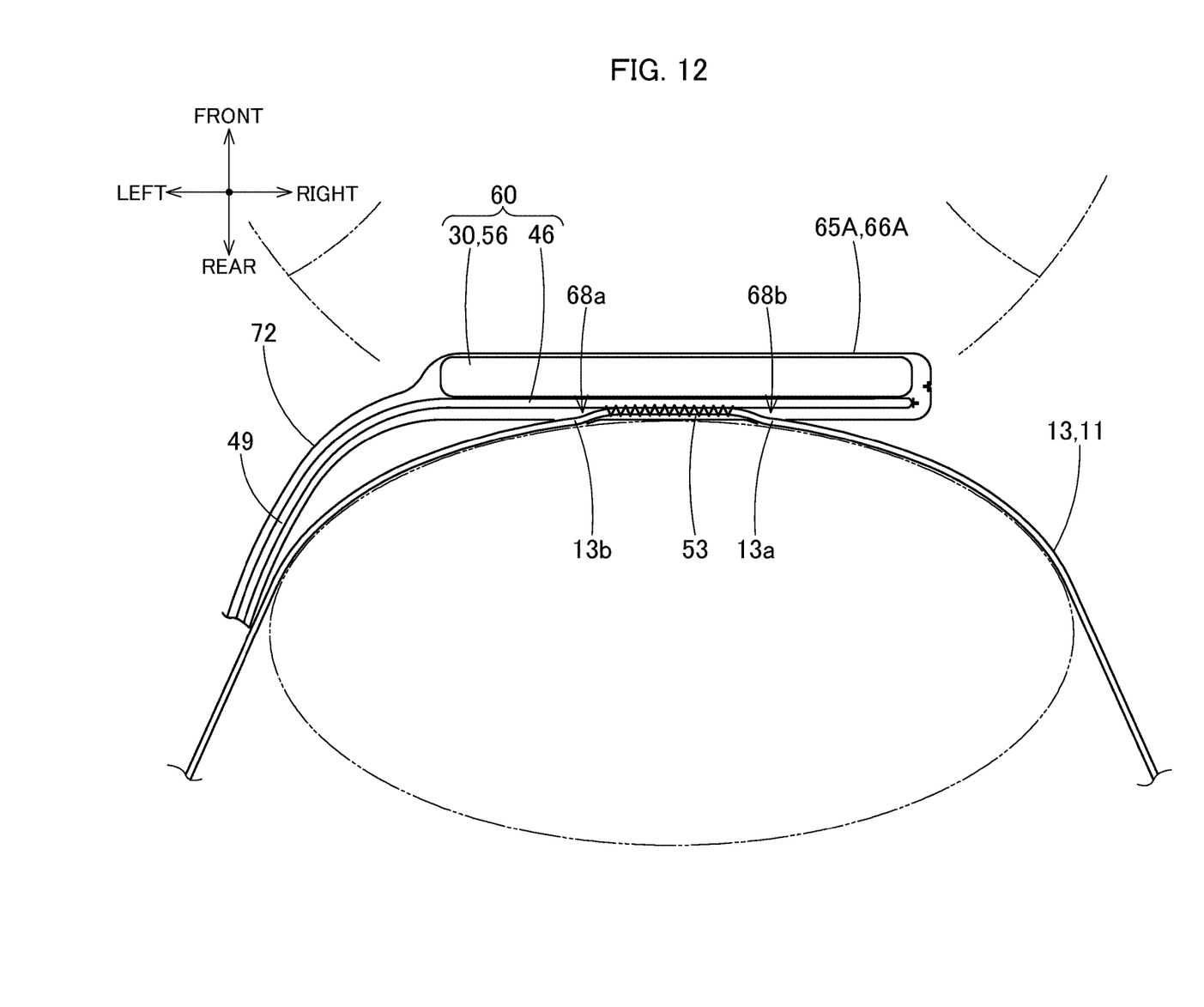
FIG. 12 is a lateral sectional schematic view of a periphery of a waist portion of an occupant in a state wherein a seatbelt is worn in the occupant protection device according to the modification.

When the aforementioned point is not taken into consideration, a configuration including a main body cover portion 66A that covers the bag assembly 60 including the joining region 53, without providing the belt cover portions 70 (L and R), wherein the apertures 68a and 68b through which the regions 13a and 13b of the lap belt portion 13 in the vicinity of the joining region 53 are caused to protrude are provided in the main body cover portion 66A, may be adopted, as in the case of a bag cover 65A shown in FIGS. 11 and 12.

Figure 13:
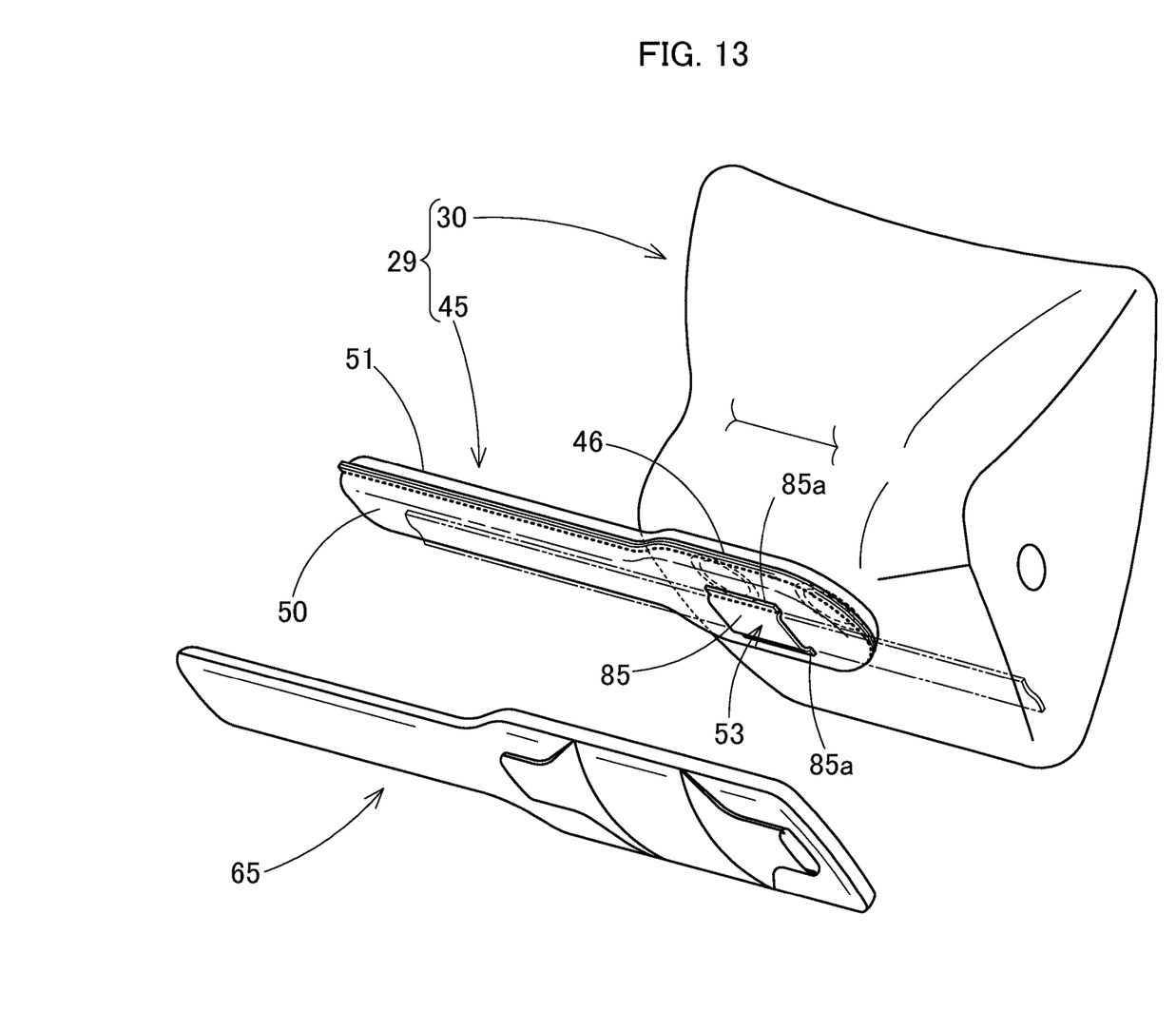
FIG. 13 is a perspective sectional schematic view of a bag assembly in the occupant protection device according to the modification.
Figure 14:
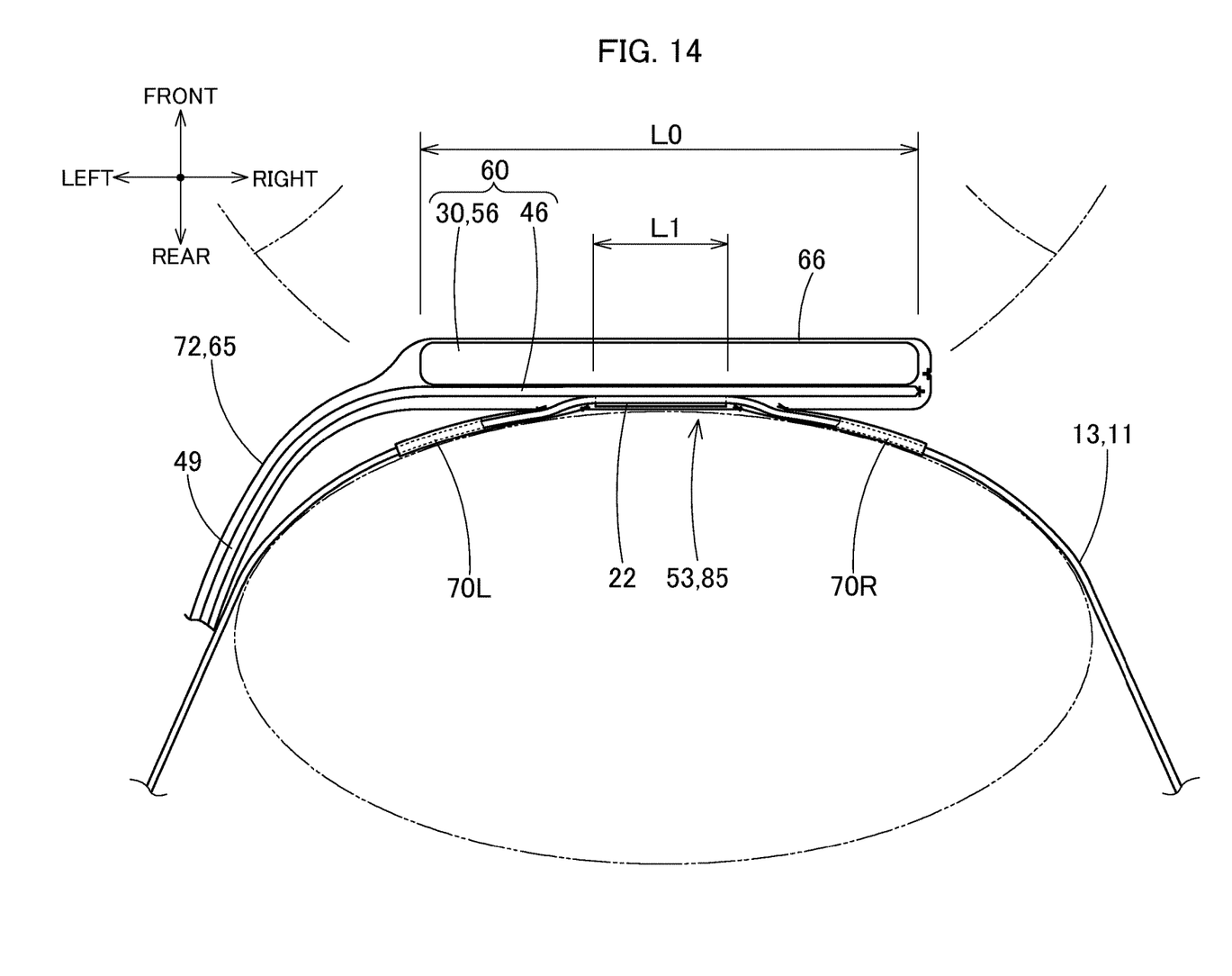
FIG. 14 is a lateral sectional schematic view of the periphery of the waist portion of the occupant in a state wherein the seatbelt is worn in the occupant protection device according to the modification.

Also, in the present embodiment, a configuration wherein the bag assembly 60 is joined by sewing to the bag disposition region 22 of the lap belt portion 13 has been described, but the invention is not limited to this. That is, provided that the bag assembly 60 is in a state of being joined to the bag disposition region 22 with deviation restricted, the bag assembly 60 may be joined to the bag disposition region 22 by utilizing a joining member 85 that encloses the bag disposition region 22 of the lap belt portion 13, as shown in FIGS. 13 and 14. The joining member 85 is such that the lap belt portion 13 is inserted therethrough in the left-right direction, and is a strip-form member wherein both upper and lower edges 85a are sewn to a region of the outer side member 50 in the base portion 46 of the conduit portion 45, and the length dimension L1 thereof is configured to be 100 mm, which is shorter than the length dimension L0 (approximately 260 mm) of the bag assembly 60. That is, the joining member 85 is an insertion portion, provided in the conduit portion 45, that causes the lap belt portion 13 and the conduit portion 45 to join by the lap belt portion 13 being inserted therethrough, and the length dimension L1 of the joining region 53 along the lap belt portion 13 is a length dimension of the joining member 85 along the lap belt portion 13.

What is claimed is:

1. An occupant protection device, comprising:
    a seatbelt having a lap belt portion that restrains a waist portion of an occupant seated in a seat;
    a pretensioner mechanism that takes up the seatbelt;
    an inflator that discharges an inflating gas; and
    an airbag that is joined to the lap belt portion, the airbag including a bag main body portion, which is housed folded, inflates owing to the inflating gas being supplied, and receives the occupant, and a conduit portion, which is connected to the inflator, guides the inflating gas discharged from the inflator to the bag main body portion, and causes the inflating gas to flow into the bag main body portion,
    wherein a length dimension along the lap belt portion of a joining region in which the airbag and the lap belt portion are joined is shorter than a length dimension along the lap belt portion of the bag main body portion in a folded state,
    wherein the length dimension of the joining region is set to be 50 mm or greater, 120 mm or less.

2. The occupant protection device according to claim 1, wherein the airbag is joined to the lap belt portion such that the conduit portion joined to the bag main body portion is joined to the lap belt portion.

3. The occupant protection device according to claim 2, wherein the conduit portion is joined by sewing to the lap belt portion, and the length dimension along the lap belt portion of the joining region is a length dimension along the lap belt portion of a portion in which the conduit portion and the lap belt portion are sewn together.

4. The occupant protection device according to claim 2, wherein the conduit portion has an insertion portion that causes the lap belt portion and the conduit portion to join by the lap belt portion being inserted therethrough, and the length dimension along the lap belt portion of the joining region is a length dimension along the lap belt portion of the insertion portion.

5. The occupant protection device according to claim 1, further comprising a bag cover having a main body cover portion, which covers the joining region and the bag main body portion, and a tubular belt cover portion, which is provided in an outer peripheral portion of the main body cover portion, and covers regions of the lap belt portion extending left and right from the joining region.

6. The occupant protection device according to claim 1, wherein the pretensioner mechanism and the inflator are mounted in the seat.

7. An occupant protection device, comprising:
    a seatbelt having a lap belt portion that restrains a waist portion of an occupant seated in a seat;
    a pretensioner mechanism that takes up the seatbelt;
    an inflator that discharges an inflating gas; and
    an airbag that is joined to the lap belt portion, the airbag including a bag main body portion, which is housed folded, inflates owing to the inflating gas being supplied, and receives the occupant, and a conduit portion, which is connected to the inflator, guides the inflating gas discharged from the inflator to the bag main body portion, and causes the inflating gas to flow into the bag main body portion,
    wherein a length dimension along a longitudinal direction of the lap belt portion of a joining region in which the airbag and the lap belt portion are joined is shorter than a length dimension along the longitudinal direction of a bag assembly along the lap belt portion, the bag assembly including the bag main body portion in a folded state.

* * * * *